May 3, 1927.
D. DE WALD
1,627,151
RETRACTABLE VEHICLE RUNNER
Filed Jan. 23, 1926
2 Sheets-Sheet 2
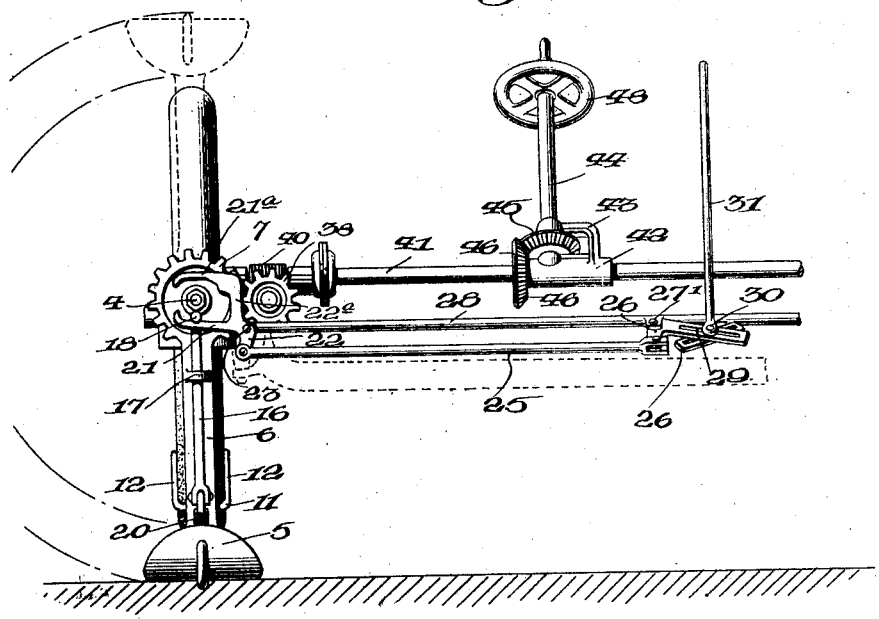
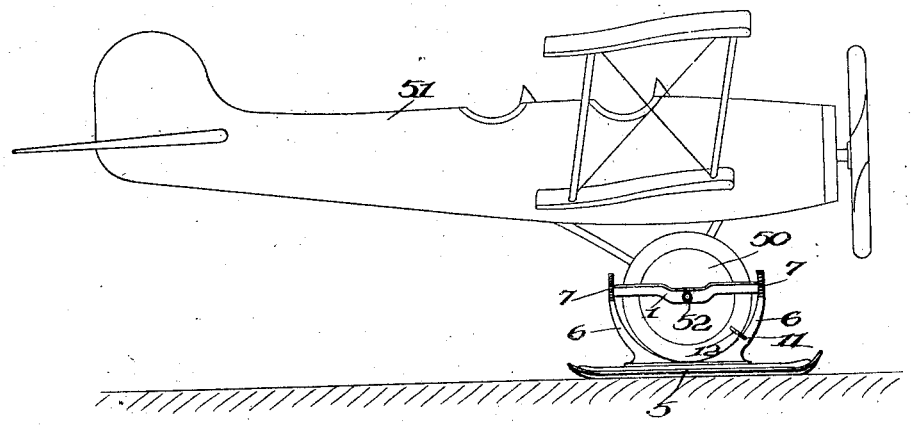
WITNESSES
INVENTOR
DANIEL DE WALD,
BY
ATTORNEYS Patented May 3, 1927.

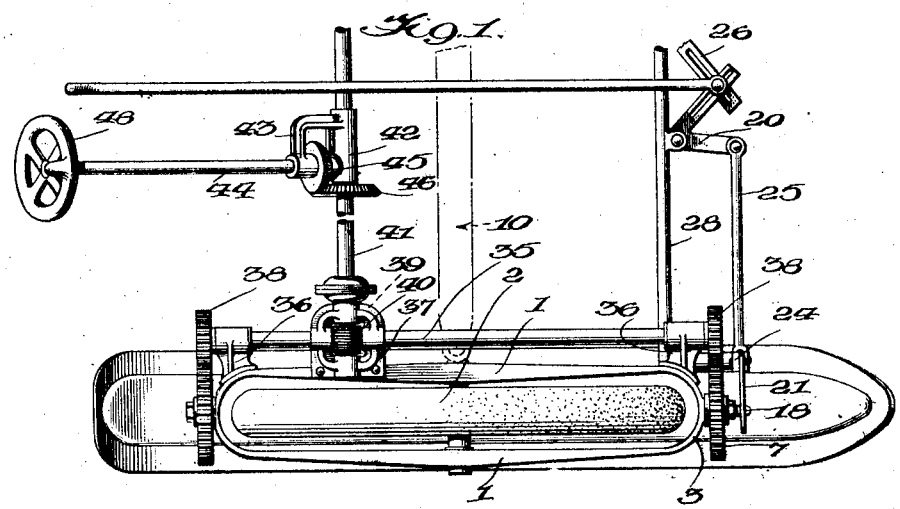

1,627,151

UNITED STATES PATENT OFFICE.

DANIEL DE WALD, OF RAWLINS, WYOMING.

RETRACTABLE VEHICLE RUNNER.

Application filed January 23, 1926. Serial No. 83,356.

My invention relates to improvements in sled runners attachments for wheeled vehicles, such as automobiles, aeroplanes, and the like, and it consists in the combinations, constructions and arrangements herein described and claimed.

An object of the invention is the provision of a sled runner attachment for wheeled vehicles which affords facilities for adjustably supporting a sled runner in association with a wheel of a vehicle so that the sled runner can be swung quickly and easily from active position underneath the associated wheel to inactive position above the wheel, or vice versa, without there being any necessity of disassembling the attachment or detaching the wheel from the axle on which it is mounted.

A further object of the invention is the provision of an attachment of the character described which has means adapted to function to hold the sled runner of the attachment normally against swinging from active position underneath the wheel and operable at will to release the runner from the wheel for swinging movement from active to inactive position.

A still further object of the invention is the provision of an attachment of the character described which has means for supporting a sled runner underneath an associated wheel so that the sled runner may have limited oscillatory movement about the axis of rotation of the wheel to compensate for irregularities in the surface over which the vehicle to which the attachment is applied moves.

Other objects and advantages of the invention will be apparent from the following description, considered in conjunction with the accompanying drawings, in which—

Figure 1 is a plan view of an attachment embodying the invention operatively applied to a vehicle wheel and axle assembly, only a portion of the axle being shown, Figure 2 is a side elevation of the structure shown in Figure 1, showing also in vertical section a fragmentary portion of a dash board or like part of the vehicle, Figure 3 is an elevation of the structure shown in Figs. 1 and 2, the view being at right angles to Figure 2, and Figure 4 is a view showing in side elevation and more or less diagrammatically an aeroplane having a sled runner attachment embodying the invention applied to a wheel of the landing gear, certain of the operating parts of the attachment being omitted.

The supporting structure of an attachment embodying the invention includes a frame which may comprise a pair of similarly formed elongated members 1 which are disposed at opposite sides of a vehicle wheel, such as the automobile wheel indicated at 2 in Figures 1 to 3 inclusive. These members 1 extend substantially diametrically of the associated wheel and are connected at their ends by curved members 3 which may be integral with the members 1 and which are disposed in slightly spaced relation to the periphery of the associated wheel. The members 3 are provided at their outer sides with aligned journals or pivot pins 4 for a purpose to be presently described. A sled runner 5 is provided at its upper side with a pair of longitudinally spaced arcuately curved arms 6 which terminate at their upper ends in transversely toothed head or spur gear portions 7 having axial openings for the reception of the journals 4. The journal members 4 have threaded end portions engaged by nuts 8 for preventing accidental displacement of the gears 7 from these journals.

The members 1 of the supporting frame have aligned transverse openings intermediate their length for the reception of the usual spindle 9 of the axle 10 on which the wheel 2 is mounted. The runner 5 therefore may have limited oscillatory movement about the axis of the spindle 9 and may move from the full line position shown in Figure 2 to the dotted line position of the same figure or to a similar inclined position at the opposite edge of the wheel. In addition, the runner 5 may be swung bodily about the axial line of the journals 4 and therefore at right angles to the axis of the spindle 9 from active position underneath the wheel as shown in Figures 1 and 2 and by the full lines in Figure 3 to an inactive position directly above the wheel as shown by the dotted line in Figure 3. When the runner 5 is in the position indicated by the dotted lines in Figure 3, it may serve as a fender or guard for the wheel.

The runner 5 is prevented from swinging accidentally about the axial line of the journals 4 from the positions shown in Figures 1 and 2 and by the full lines in Figure 3 by a latch 11 which is substantially U-shaped and includes a pair of arms or forks 12 which may extend radially inward beyond the periphery of the wheel 2 at opposite sides of the latter. The latch 11 is carried at the inner end of an operating lever 13 which extends through a radial opening in one of the arms 6 and is supported intermediate its length, as by the pivot element 14, for swinging movement about an axis parallel to the axis of rotation of the wheel. The lever 13 is pivotally connected at its outer end, as at 15, to a push rod 16 which extends loosely through an opening in a guide lug 17 on the associated arm 6 and is provided at its normally upper end with a laterally turned portion, as at 18. The lever 13 may have an integral ear or lug portion 19 at its outer end connected by a tension spring 20 with the runner 5. The push rod 16 normally is held in raised position against the action of the spring 19 by reason of the engagement of an arm 21 of a bell crank lever 22 with the laterally turned end portion 18 of the push rod, whereby the latch 11 will be held in the position shown by the full lines in Figures 1 to 3 inclusive or the upper dotted line position in Figure 2. The bell crank 22 is fulcrumed on a pivot element 23 which is carried by an ear or bracket 24 on the adjacent end portion 3 of the supporting frame of the attachment. The second arm of the bell-crank 22 is pivotally attached to the outer end of a connecting rod 25 which is pivotally connected at its inner end to an arm of a bell crank 26. The latter is fulcrumed, as at 27, on a laterally turned ear on a supporting rod 28, one end portion of the supporting rod 28 being rigidly joined in any suitable known manner to the adjacent side member 1 of the supporting frame of the attachment.

The second arm of the bell crank lever 26 is slotted at 29 for engagement with a pin 30 that is carried by an operating rod 31. The operating rod 31 may extend through an opening 32 in a dash board 33 or like part of a vehicle with which the attachment is associated and may be provided at its free end with a laterally turned handle portion 34 which will function to limit the axial movement of the rod 31 through the opening 32 toward the bell crank 26. When it is desired to swing the runner 5 from the position shown by the full lines in Figures 1 to 3 inclusive to the position shown by the dotted lines in Figure 3, the handle 34 of the rod 31 is grasped by the operator of the vehicle and the rod 31 is pulled, thus causing the arm 21 of the bell-crank 22 to swing downward and permitting the spring 20 to function to swing the latch arms 12 to the positions indicated by the dotted lines at $x$ in Figure 2, thus releasing the runner from the wheel. The invention contemplates the provision of suitable mechanism, operable by the driver of the vehicle, to swing the runner 5 from the full line positions of Figures 1 to 3 inclusive to the dotted line position of Figure 3. Such mechanism may include a driven shaft 35 which extends parallel to the inner side member 1 of the supporting frame of the attachment and is journaled in bearings provided on brackets 36—37—36, the brackets 36 being secured to the end portions of the supporting frame of the attachment at the inner side of the latter and the bracket 37 being secured to the inner side member 1 of the supporting frame of the attachment at a point somewhat nearer to the rear bracket 36 than to the front bracket 36. The shaft 35 carries spur gears 38 at its opposite ends in mesh with the toothed head portions 7 of the runner supporting arms 6. The shaft 35 also carries a worm wheel 39 in mesh with a worm 40 on a second motion shaft 41 which extends transversely of the vehicle and has an end portion thereof journaled in a suitable bearing on the bracket 37. A stationary sleeve 42 encircles the shaft 41 and carries a bracket 43 which is formed to provide a bearing for an operating or drive shaft 44. The shaft 44 carries a bevel gear 45 in mesh with a bevel gear 46 on the shaft 41. The shaft 44 extends through an opening 47 in the dash board of the vehicle and carries a hand wheel 48 which can be conveniently grasped and manipulated by the operator of the vehicle.

From the foregoing description of the various parts of the device, the operation thereof may be readily understood. It will be understood that the transverse shaft 41 and the supporting rod 28 extend across the vehicle and that the wheel, not shown, of the vehicle which is opposite the wheel 2 also will be provided with a runner 5 and operating parts similar to those hereinbefore described for transmitting motion from the shaft 41 to the runner for the second wheel and from the latch operating rod 31 to the latch for the runner for the second wheel. A portion of the bell-crank 26 of the latch operating mechanism of the runner for the second wheel is shown in Figures 1 and 3. Turning of the hand wheel 48 when the latch arms 12 are in the position shown by the dotted lines at $x$ in Figure 2 will result in rotation of the driven shaft 35 and the runner 5 will be swung bodily about the axial line of the journals 4 from the position shown by the full lines in Figs. 1 to 3 inclusive to the position shown by the dotted lines in Fig. 3. When the runner is in its raised and inactive position as shown by the dotted lines in Fig. 3, it will serve as a guard or fender for the wheel and it may be releasably held in its raised position by the friction between the worm and worm wheel of the runner operating mechanism, or if desired the latch 11 may be utilized in connection with the wheel to hold the runner in raised position by placing on the bell crank 22 a right angular extension 22ᵃ having an arm 21ᵃ operable to engage with the member 18 when the rod 31 is pulled and to then swing the latch 11 to latching position. Means, not shown, then would be provided to hold the rod 31 in its pulled out position. The hand wheel 48 also may be turned to cause the runner to swing from its raised inactive position to the full line positions shown in Figures 1 to 3 inclusive. When the runner is in its lowered active position underneath the associated wheel, it may have limited swinging or oscillatory movement about the axis of rotation of the wheel so that the runner will rest flatly on the snow even though irregularities occur in the surface of the snow or other supporting surface. In Fig. 4 I show the runner associated with a wheel 50 of the landing gear of an aeroplane 51, the supporting frame of the attachment on which the arms 6 are pivotally supported being connected pivotally with the axle 52 on which the wheel 50 is mounted in the same manner as the supporting frame of the attachment is shown in Figures 1 to 3 inclusive as being connected with the automobile wheel axle. The runner operating and adjusting mechanism which the invention provides and also the latch operating mechanism have been omitted from the illustration of the attachment in Figure 4, but it is to be understood that I may make use of the hereinbefore described runner operating mechanism and latch operating mechanism or any other suitable operating mechanisms for releasably holding the runner in its lowered active position and for adjusting the runner between its lowered active position and its raised inactive position, when desired.

Obviously, my invention is susceptible of embodiment in forms other than that illustrated in the accompanying drawings and I therefore consider as my own all such modifications and adaptations of the form of the device herein described as fairly fall within the scope of the appended claims.

I claim:—

1. The combination with a wheel and its axle, of a frame including a pair of side members of greater length than the diameter of the wheel and having aligned transverse openings for the reception of said axle, said side members being disposed at opposite sides of the wheel and said frame including end members connecting the ends of said side members, aligned journal members at the outer sides of the end members of said frame, and a runner having a pair of longitudinally spaced upstanding arms swingingly supported at their upper ends on said journal members.

2. The combination with a wheel and its axle of a frame including a pair of side members of greater length than the diameter of the wheel and having aligned transverse openings for the reception of said axle, said side members being disposed at opposite sides of the wheel and said frame including end members connecting the ends of said side members, aligned journal members at the outer sides of the end members of said frame, a runner having a pair of longitudinally spaced upstanding arms swingingly supported at their upper ends on said journal members, and a pivoted latch member carried by one of said runner supporting arms, said latch member comprising a pair of forks adapted to extend radially inward beyond the periphery of the wheel at opposite sides of the latter and then to prevent swinging movement of said runner about an axis at right angles to the axis of the wheel, spring means tending to swing said latch so that the forks thereof will be disposed completely outward of the periphery of the wheel, and manually releasable means functioning to prevent operation of said latch by said spring.

3. The combination with a wheel and its axle, of a frame including a pair of side members of greater length than the diameter of the wheel and having aligned transverse openings for the reception of said axle, said side members being disposed at opposite sides of the wheel and said frame including end members connecting the ends of said side members, aligned journal members at the outer sides of the end members of said frame, a runner having a pair of longitudinally spaced upstanding arms swingingly supported at their upper ends on said journal members, a pivoted latch member carried by one of said runner supporting arms, said latch member comprising a pair of forks adapted to extend radially inward beyond the periphery of the wheel at opposite sides of the latter and then to prevent swinging movement of said runner about an axis at right angles to the axis of the wheel, spring means tending to swing said latch so that the forks thereof will be disposed completely outward of the periphery of the wheel, and manually releasable means functioning to prevent operation of said latch by said spring, said manually releasable means comprising a rod mounted for limited longitudinal movement and connected at one end with said spring, said rod having a laterally turned stop portion at one end, a bell-crank having an arm in contact with said stop, and a manually releasable rod and lever arrangement connected with the second arm of said bell crank and normally holding said bell crank in position to prevent movement of said rod from position to prevent said spring from functioning to operate said latch.

4. The combination with a wheel and its axle, of a frame comprising a pair of side members respectively disposed at opposite sides of the wheel and swingingly supported intermediate their ends on said axle, said side members being of greater length than the diameter of the wheel, said frame also including end members connecting the ends of said side members, said end members having outwardly extending aligned journal elements, a runner having a pair of longitudinally spaced upstanding arms provided adjacent to their extremities with aligned openings for the reception of said journal elements, the space between said arms being sufficient to accommodate at least half of said wheel, the upper portions of said arms being formed to provide gears rigid with the arms, a rotary operating shaft located at a distance from said wheel, and motion transmitting means connecting said operating shaft with the gear portions of said runner supporting arms.

5. The combination with a wheel and its axle, of a frame comprising a pair of side members respectively disposed at opposite sides of the wheel and swingingly supported intermediate their ends on said axle, said side members being of greater length than the diameter of the wheel, said frame also including end members having outwardly extending aligned journal elements, a runner having a pair of longitudinally spaced upstanding arms provided adjacent to their extremities with aligned openings for the reception of said journal elements, the space between said arms being sufficient to accommodate at least half of said wheel, the upper portions of said arms being formed to provide gears rigid with the arms, a shaft supported adjacent to said wheel in parallel relation to the side member of said frame, said shaft having gears at its ends in mesh with the gear portions of said arms, an operating shaft adapted to be manipulated by the driver of the vehicle of which said wheel is a part, and motion transmitting means connecting said operating shaft with said first named shaft.

DANIEL DE WALD.